United States Patent Office 2,718,524
Patented Sept. 20, 1955

2,718,524

PRODUCTION OF TETRAESTERS OF PYROPHOSPHORIC ACID

William M. Lanham, Charleston, and Percy L. Smith, Dunbar, W. Va., assignors to Union Carbide and Carbon Corporation, a corporation of New York No Drawing. Application February 17, 1954,
Serial No. 411,018

9 Claims. (Cl. 260—461)

This invention relates to the production of tetraesters of pyrophosphoric acid; and more especially it concerns a novel process for making pyrophosphate esters of the type designated by the formula $$(RO)_2-P(=O)-O-P(=O)(OR)_2$$

wherein R designates a radical of the class consisting of the alkyl, the halogen-substituted alkyl, the monocyclic aryl and the aralkyl radicals having 1 to 20 carbon atoms.

The novel process of the invention involves reacting a halophosphate ester of the type $$(RO)_2PX$$
$$\parallel$$
$$O$$

wherein R has the meaning hereinbefore designated, and X designates a halogen, such as chlorine or bromine, with an anhydrous alkali metal salt or ammonium salt of an organic acid containing one to three $$-\overset{O}{\underset{\parallel}{C}}-O-$$

groups, such as carbonic acid, the aliphatic mono-, di- and tri-carboxylic acids; the aromatic mono- and dicarboxylic acids; and halogen-substituted carboxylic acids, such as monochloroacetic, 2-bromobutanoic, chlorosuccinic, bromomalonic, p-chlorobenzoic and tetrachlorophthalic acids. The reaction preferably is conducted at temperatures within the range from about 60° C. to about 100° C., although the process is operative at temperatures within the range from 25° C. to 200° C.

When using an alkali metal salt of a monocarboxylic acid as a reactant, the process involves the reaction of equimolar quantities of the monohalophosphate ester and the said salt, as indicated in the following overall equation

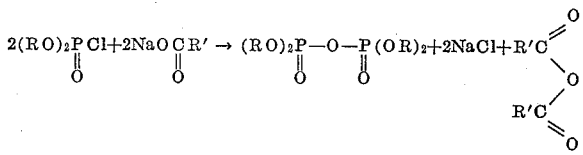

wherein R has the meaning previously indicated, and R' designates a radical of the class consisting of the alkyl, halogen-substituted alkyl, monocyclic aryl, aralkyl and halogen-substituted aryl and aralkyl radicals. However, a slight molar excess, (i. e., 0.5 to 5.0 mol percent) of such salt is preferred, and an even greater excess can be used.

When using an alkali metal salt of a di- or tribasic organic acid, such as sodium carbonate, sodium or potassium oxalate, malonate, succinate or tricarballylate, the reaction involves one mol of such a salt and two to three mols of the monohalophosphate ester, depending upon whether the salt reactant is that of a dibasic or a tribasic acid. Here again it is preferred to have present an excess of the salt reactant.

When using an alkali metal carbonate as a reactant the reaction evidently proceeds as follows:

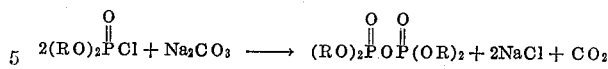

The reaction mixture then is cooled, usually to room temperature, and is filtered to remove the sodium chloride by-product. When using as a reactant an alkali metal salt of an aliphatic lower monocarboxylic acid, such as sodium acetate, the resultant acid anhydride can be removed by vacuum distillation of the filtrate. The pyrophosphate ester is then recovered as residue product in good yields, and is of high purity. When using the salt of an organic acid, the anhydride of which acid boils above the boiling point of the pyrophosphate tetraester, the latter can be recovered as distillate in connection with the fractional distillation of the filtered reaction mixture under high vacuum.

When an alkali metal salt of a tricarballylic acid is used as a reactant the reaction is believed to proceed as follows:

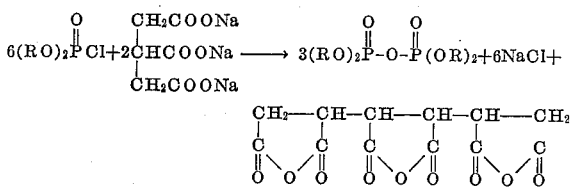

although the polyanhydride has not been identified.

Among the monohalophosphate esters useful in the process are the dimethyl, diethyl, dibutyl, dihexyl, didecyl, ditetradecyl, di-(2-chloroethyl), diphenyl, dibenzyl, ditolyl and dixylenyl esters of monochlorophosphoric and monobromophosphoric acids.

Among alkali metal and ammonium salts of organic acids used in the process are the sodium, potassium, lithium and ammonium salts of the following acids: carbonic, formic, acetic, propionic, butyric, methacrylic, isobutyric, alpha-methylbutyric, valeric, hexoic, caproic, caprylic, capric, lauric, oleic and stearic acid; the corresponding salts of aliphatic polycarboxylic acids, such as the disodium, dipotassium, dilithium and diammonium salts of the following acids: oxalic, malonic, succinic, glutaric, adipic, pimelic, suberic, azelaic, sebacic, methylsuccinic, alpha-methylglutaric, and beta-ethyladipic acids; and the corresponding tri-alkali metal and ammonium salts of tricarballylic acid and of camphoronic acid; the corresponding alkali metal and ammonium salts of aromatic mono- and di-carboxylic acids, such as benzoic, and the toluic and phthalic acids; and the corresponding salts of halogen-substituted saturated aliphatic and aromatic mono- and di-carboxylic acids, such as monochloroacetic, 2-bromobutanoic, chlorosuccinic, bromomalonic and p-chlorobenzoic acids. The preferred salts are the alkali metal and ammonium salts of carbonic acid and the fatty acids having up to 20 carbon atoms.

The following examples will serve to illustrate the invention.

Example 1

During 10 minutes 82.5 grams (1.006 mol) of anhydrous sodium acetate were gradually added with agitation to 173 grams (1.0 mol) of diethyl chlorophosphate maintained at 60° C. with cooling. After an additional 1.5 hour at 60° C., the reaction mixture was cooled to 25° C., 20 grams of a filter aid were added, the mixture was filtered, and the residue washed with ethyl ether. The filtrate was stripped by pot distillation to a kettle temperature of 115° C. under a pressure of less than 3 mm. of mercury. The colorless liquid residue amounted to 144 grams (theory=145 grams). It had an equivalent weight (by saponification) of 149.5 (theory=145.1). This residue was distilled in a falling film type still and 122 grams of a colorless distillate was secured, distilling at 124° C. under a pressure of less than 0.2 mm. of mercury. This distillate, tetraethyl pyrophosphate, secured in 84% yield, based upon the phosphorus-containing reactant, had the following properties: $n_D^{30}=1.4146$; equivalent weight (by saponification) 143.2 (theory= 145.1); per cent P, by wt.=21.12; (theory=21.35); salt=nil; per cent Cl=nil.

*Example 2*

Following the procedure and employing the reactants described in Example 1, with the exception that the liquid residue left after stripping the filtrate by pot distillation to a kettle temperature of 115° C. under a pressure of less than 3 mm. of mercury was fractionally distilled under vacuum in a modified Claisen type still, separately recovering tetraethyl pyrophosphate as a fraction boiling between 122° C. under 0.5 mm. of mercury pressure and 131° C. under 1.2 mm. of mercury pressure, and having $n_D^{30}=1.4141$ and the following analysis:

|  | Actual | Theory |
| --- | --- | --- |
| Percent P, by wt | 21.35 | 21.35 |
| Percent C, by wt | 34.70 | 33.12 |
| Percent H, by wt | 6.83 | 6.94 |
| Percent Cl, by wt | nil | nil |

*Example 3*

During 20 minutes 41 grams (0.5 mol) of anhydrous sodium acetate were gradually added to 114 grams (0.5 mol) of dibutyl chlorophosphate held at 95°–100° C. After another hour at 100° C. and standing overnight at 25° C. the reaction mixture was filtered, using a filter aid, and the residue was washed with ethyl ether. The filtrate was stripped by distillation to a kettle temperature of 130 C. under a pressure of less than 2 mm. of mercury, and 100 grams (theory=100.6 grams) of the almost colorless residue of tetrabutyl pyrophosphate had an equivalent weight (by saponification) of 211.2 (theory=201.2). Distillation of this residue under vacuum in a falling film type still yielded a purified colorless product distilling at 150° C. under a pressure of less than 0.2 mm. of mercury. It had the following properties: $n_D^{30}=1.4262$; per cent P, by wt.=14.79; per cent Cl=nil; yield=69%, based upon the phosphorus-containing reactant.

*Example 4*

During 10 minutes 41 grams (0.5 mol) of anhydrous sodium acetate were gradually added to 120 grams (0.5 mol) of di-(2-chloroethyl) chlorophosphate held at 90°–100° C. with cooling. After holding it at 100° C. for another 1.5 hours the reaction mixture was cooled to 25° C., 20 grams of a filter aid and 100 cc. of ethyl ether added, and the mixture was filtered. The filtrate was stripped by distillation to a kettle temperature of 130° C. under a pressure of less than 0.2 mm. of mercury, and the residue therefrom was distilled at 180° C. under the same pressure, using a falling film type still. The tetra-(2-chloroethyl) pyrophosphate was recovered as a slightly yellow, liquid distillate having the following properties: $n_D^{30}=1.4688$; per cent P, by wt.=13.38; per cent Cl, by wt.=31.88.

*Example 5*

During 15 minutes 33 grams (0.4 mol) of anhydrous sodium acetate were added to 107 grams (0.4 mol) of diphenyl chlorophosphate, with agitation, maintained at 100° C. After an additional 2 hours at 90°–100° C. the reaction mixture was cooled to 25° C., 20 grams of a filter aid and 100 cc. of ethyl ether added thereto, and the mixture was filtered. The filtrate was stripped by distillation to 130° C. under 2 mm. of mercury. The 96 grams of clear liquid distillation residue (theory 96.4 grams) was distilled at 180° C. under less than 0.2 mm. of mercury pressure in a falling film type still. The tetraphenyl pyrophosphate was obtained as a colorless oily liquid distillate having the following properties and analysis: $n_D^{30}=1.5536$; equivalent weight (by saponification)=232.2 (theory=241.2);

| Analysis | Obtained | Theory |
| --- | --- | --- |
| Percent P, by wt | 11.79 | 12.84 |
| Percent C, by wt | 59.02 | 59.75 |
| Percent H, by wt | 4.27 | 4.18 |
| Percent Cl, by wt | 0 | 0 |

*Example 6*

During 30 minutes 36 grams (0.27 mol) of anhydrous sodium oxalate were added gradually to 86 grams (0.5 mol) of diethyl chlorophosphate with agitation and heating to maintain a temperature of 60° C. The heating at 60° C. was continued for an additional 13 hours until the evolution of gas had ceased and the reaction mixture had lost 18 grams of weight due to gas evolution. (Theory 19 grams.) Ten grams of a filter aid were added to the reaction mixture and it was filtered. The residual pale yellow filtrate had a refractive index $n_D^{30}=1.4171$, and contained 89.6% of tetraethyl pyrophosphate.

*Example 7*

During 20 minutes 29 grams (0.274 mol) of anhydrous sodium carbonate were added with agitation to 86 grams (0.5 mol) of diethyl chlorophosphate while maintaining a reaction temperature around 60° C. There was a vigorous heat of reaction and a copious evolution of gas. After the reaction subsided the mixture was heated for 30 minutes at 60° C. A total of 10 grams of gas (theory 11 grams) was eliminated. The reaction mixture was then cooled, 10 grams of a filter aid added, and the mixture filtered. The colorless filtrate contained 93.7% of tetraethyl pyrophosphate; and it had a refractive index $n_D^{30}=1.4151$, and a salt content=0.01 cc. of normal HClO4 solution per gram.

*Example 8*

To 91 grams (0.4 mol) of dibutyl chlorophosphate were slowly added with agitation during 15 minutes 38 grams (0.157 mol) of dry sodium tricarballylate at a temperature of 100° C. After an additional hour at 100° C. the reaction mixture was brought to 25° C., 22 grams of a filter aid and 50 cc. of toluene were added, and the mixture was filtered. The filtrate was washed with four 50 cc. portions of ice water; and the washed filtrate was stripped by distillation to a kettle temperature of 130° C. under a pressure of less than 2 mm. of mercury, yielding a light brown liquid residue containing 88.7% of tetrabutyl pyrophosphate, and 10.6% of tricarballylic acid, and having a $n_D^{30}=1.4310$; percent Cl=nil, salt content=nil.

*Example 9*

During 15 minutes 158 grams (0.516 mol) of anhydrous sodium stearate were added to an agitated solution of 86 grams (0.5 mol) of diethyl chlorophosphate in 200 cc. of benzene held at a temperature of 60° C. After stirring the mixture for another six hours and allowing it to stand about 15 hours at 25° C., 100 cc. of benzene were added to the mixture and it was filtered. The solid residue was washed with ethyl ether, and the filtrate and the ether washings were combined and stripped by distillation to a kettle temperature of 100° C. under less than 2 mm. of mercury pressure. The liquid residue was distilled at 78° C. under a pressure of less than 0.2 mm. of mercury, using a falling film type still, and the tetraethyl pyrophosphate was secured in the form of a colorless liquid distillate having $n_D^{30}=1.4151$; equivalent weight, by saponification=154.9 (theory=145.1); percent P, by wt.=20.37; (theory=21.35).

*Example 10*

During 5 minutes 69 grams (0.4 mol) of diethyl chlorophosphate were added dropwise to an agitated suspension of 37 grams (0.228 mol) of anhydrous disodium succinate in 150 cc. of xylene while heating to maintain the reaction mixture at 60° C., which was held for 14 additional hours. The reaction mixture then was allowed to stand overnight at 25° C., filtered, and the solid residue washed with ethyl ether. The filtrate and the ether washings were combined and stripped by pot distillation to a kettle temperature of 115° C. under a pressure of less than 2 mm. of mercury. The distillation residue was filtered yielding as filtrate tetraethyl pyrophosphate.

*Example 11*

During 20 minutes with agitation 42 grams (0.55 mol) of anhydrous ammonium acetate were added through a powder funnel to 86 grams (0.5 mol) of diethyl chlorophosphate while cooling to maintain the reaction mixture at 60° C. during this time and for an additional 2 hours. The mixture was allowed to stand over two days at 25° C., then 20 grams of a filter aid and 100 cc. of ethyl ether were added and the mixture was filtered. The filtrate was stripped by pot distillation to a kettle temperature of 110° C. under less than 3 mm. of mercury pressure. The distillation residue was distilled at 124° C. under a pressure of less than 0.2 mm. of mercury, using a falling film type still, providing a 76% yield of tetraethyl pyrophosphate, based upon the diethyl chlorophosphate.

*Example 12*

During 32 minutes 86 grams (0.5 mol) of diethyl chlorophosphate were added to a suspension of 158 grams (0.52 mol) of anhydrous sodium oleate in 650 cc. of benzene maintained at 60° C. After another 1.75 hours at 60° C. and around 15 hours at 25° C., the reaction mixture was filtered, and the filtrate was stripped by fractional distillation to a kettle temperature of 60° C. under less than 2 mm. of mercury pressure. The resultant 196 grams of orange liquid residue was distilled at 78° C. under less than 0.2 mm. of mercury using a falling film type still. The resultant colorless distillate had the following properties: equivalent weight (by saponification)=153.8 (theory=145.1); $n_D^{30}$=1.4158; percent Cl=nil; percent P=20.11; percent yield=58, based upon the phosphorus-containing reactant.

*Example 13*

During 30 minutes 27 grams (0.25 mol) of dry sodium methacrylate were added in small successive portions to a solution consisting of 43 grams (0.25 mol) of diethyl chlorophosphate, 50 cc. of toluene, and 0.2 gram of phenyl-beta-naphthylamine maintained at 60° C. After heating the mixture for 2.3 additional hours and allowing it to stand overnight at 25° C. and adding 15 grams of diatomaceous earth filter aid and 50 cc. of ethyl ether the reaction mixture was filtered, and the filtrate was stripped by distillation to a kettle temperature of 115° C. under a pressure of less than 1 mm. of mercury. The distillation residue was filtered yielding 21 grams of a clear yellow chlorine-free liquid composed of 86.5% tetraethyl pyrophosphate, 7.3% of methacrylic anhydride and 6.2% of sodium diethyl phosphate.

The invention is susceptible of modification within the scope of the appended claims.

We claim:

1. Process which comprises reacting (1) a halophosphate diester of the structure (RO)₂P(O)X, wherein R designates a radical of the class consisting of the alkyl, haloalkyl, monocyclic aryl and aralkyl radicals, and X designates a radical of the class consisting of chlorine and bromine, with (2) a substantially anhydrous salt of an organic acid having from one to three

groups, and separately recovering from the reaction mixture a pyrophosphate tetraester of the structure

2. Process which comprises reacting (1) a halophosphate diester of the structure (RO)₂P(O)X, wherein R designates a radical of the class consisting of the alkyl, haloalkyl, monocyclic aryl and aralkyl radicals, and X designates a radical of the class consisting of chlorine and bromine, with (2) a substantially anhydrous salt of an organic acid of the class consisting of the alkali metal and ammonium salts of organic acids having from one to three

groups, and separately recovering from the reaction mixture a pyrophosphate tetraester of the structure

3. Process as defined in claim 2 wherein the said salt is an alkali metal salt of a lower fatty acid.

4. Process as defined in claim 2 wherein the said salt is an ammonium salt of a lower fatty acid.

5. Process as defined in claim 2 wherein the said salt is an alkali metal salt of a saturated aliphatic dicarboxylic acid.

6. Process as defined in claim 2 wherein the said salt is an alkali metal salt of a saturated aliphatic tricarboxylic acid.

7. Process as defined in claim 2 wherein the said salt is an alkali metal salt of an aromatic carboxylic acid having one to two

groups.

8. Process as defined in claim 2 wherein the said salt is an alkali metal carbonate.

9. Process as defined in claim 2 wherein the said salt is an alkali metal acetate.

References Cited in the file of this patent

UNITED STATES PATENTS 2,663,722    Toy _____ Dec. 22, 1953

OTHER REFERENCES

Toy: Jour. of Amer. Chem. Soc., v. 70, pp. 3882–86 (1948).